United States Patent [19]

Preziosi et al.

[11] 4,174,008

[45] Nov. 13, 1979

[54] ACCESS PANEL FASTENER RETAINER

[75] Inventors: Joseph R. Preziosi, Clark; Paul A. Trimmer, Berkeley Heights, both of N.J.

[73] Assignee: Amerace Corporation, New York, N.Y.

[21] Appl. No.: 865,027

[22] Filed: Dec. 28, 1977

[51] Int. Cl.$^2$ .................................................. F16B 43/00
[52] U.S. Cl. .................................. 151/69; 24/217 R; 85/8.8
[58] Field of Search ................ 85/1 K, 8.8, 33; 151/41.75, 69; 285/318, 321, 322; 24/217 R; 279/41 R, 79

[56] References Cited

U.S. PATENT DOCUMENTS

| 800,651 | 10/1905 | Janney | 279/79 X |
|---|---|---|---|
| 2,631,872 | 3/1953 | Wurmser | 85/8.8 X |
| 2,896,496 | 7/1959 | Jansen | 285/322 |
| 2,925,802 | 2/1960 | White | 85/8.8 X |
| 3,085,820 | 4/1963 | Pollia | 85/8.8 X |
| 3,138,188 | 6/1964 | Tuozzo et al. | 151/69 |
| 3,151,653 | 10/1964 | Zahodiakin | 151/69 X |
| 3,217,774 | 11/1965 | Pelochino | 151/69 |
| 3,352,341 | 11/1967 | Schertz | 85/33 X |
| 3,520,223 | 7/1970 | Lilly | 85/33 X |
| 4,125,140 | 11/1978 | Basile | 151/69 |

*Primary Examiner*—Thomas J. Holko
*Attorney, Agent, or Firm*—Richard A. Craig

[57] ABSTRACT

Disclosed herein is a bolt retainer for use as a component of an access panel fastener. The retainer comprises a grommet having an axial end and an aperture in open communication therewith. The grommet has a radial shoulder surface facing away from the end of the grommet which also has an internal surface extending toward the end of the grommet from the radially inner edge of the radial shoulder surface. The disclosed retainer has only two discrete retaining jaws in the aperture adjacent the radial shoulder surface and spring means biasing the jaws toward the axis. Each jaw is C-shaped and is substantially 180° in circumferential extent. Each jaw also includes a boss adapted to enter the cylindrical surface of the grommet to limit jaw opening and the jaws present to the bolt a configuration of greater axial length than the pitch of the bolt thread.

10 Claims, 6 Drawing Figures

U.S. Patent    Nov. 13, 1979    4,174,008
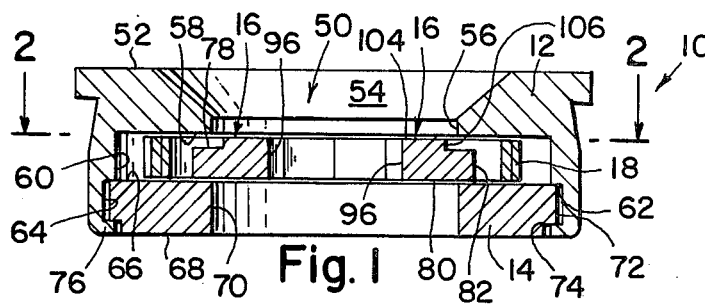
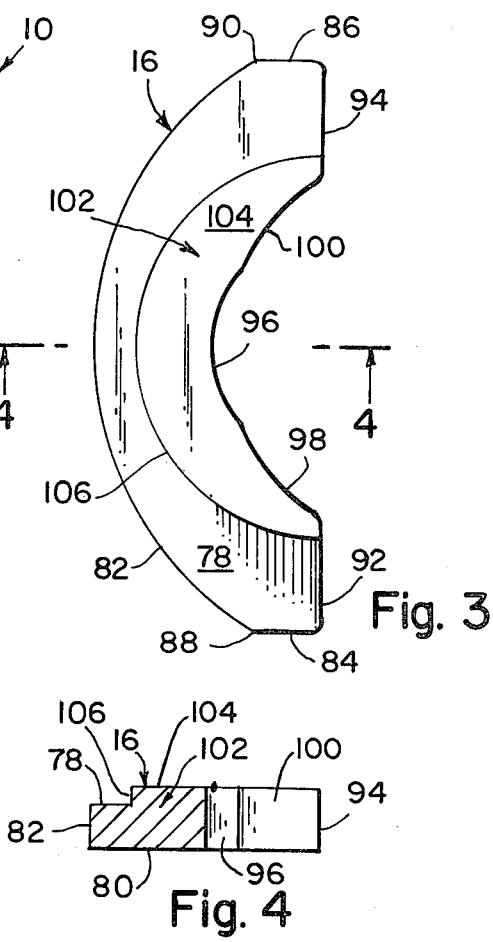
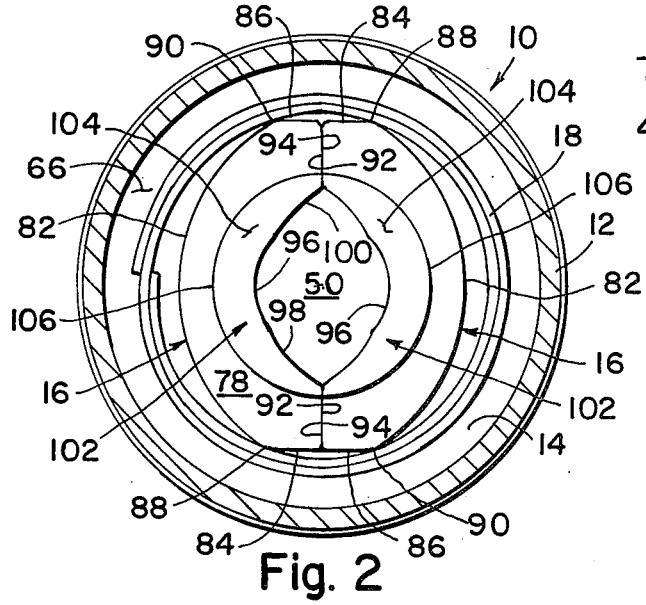
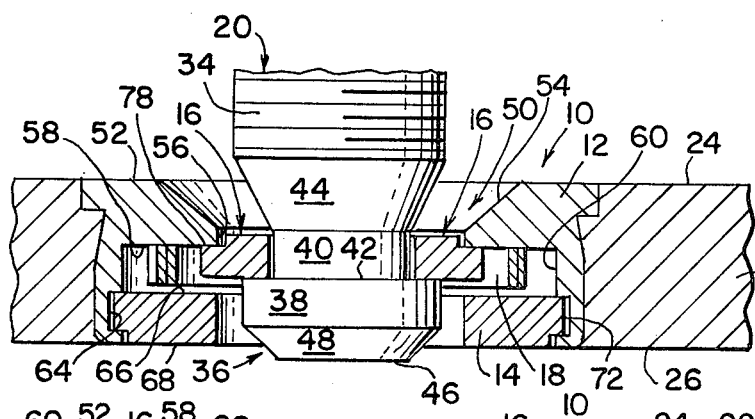
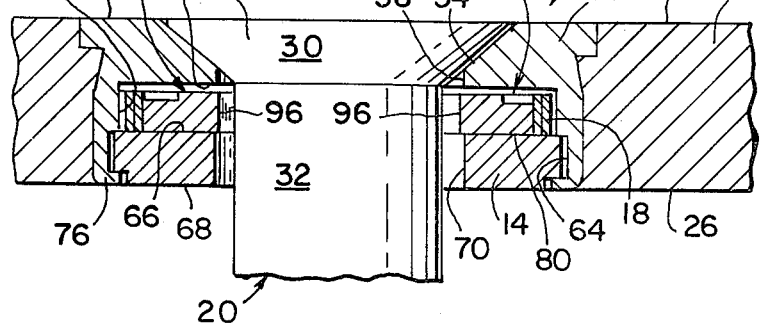

ACCESS PANEL FASTENER RETAINER

BACKGROUND OF THE INVENTION

This invention relates to an improved bolt retainer for use as a component of an access panel fastener for securing a panel to a structure.

Copending Basile U.S. Pat. No. 4,125,140, and assigned to the same assignee as the present application, discloses an access panel fastener which includes as a component thereof a bolt retainer adapted to be mounted in an aperture through a panel which is to be secured to a structure by the access panel fastener. Said Basile U.S. Pat. No. 4,125,140 access panel fastener includes, in addition to the retainer, a bolt of a particular configuration and a nut assembly. The nut assembly is mounted on the structure aligned with an aperture therethrough and the bolt is intended to be permanently captured by the retainer and is movable axially relative to the retainer between a securing or clamping position in which the bolt may engage the nut assembly and a hold-out position.

More particularly, the retainer of said Basile U.S. Pat. No. 4,125,140 is ring-like and comprises an annular body and a disc which cooperate to provide an aperture extending through the retainer. The retainer of said Basile U.S. Pat. No. 4,125,140 also includes three discrete bolt engaging jaws located in the aperture for movement in radial directions. Each of the three jaws is a segment of a generally annular configuration and is of uniform thickness, having opposite plane faces perpendicular to the retainer axis. Finally, the retainer of said Basile U.S. Pat. No. 4,125,140 includes a cochlear spring which surrounds the three jaws and biases the same toward the retainer axis and into engagment with the bolt to hold the same in the hold-out position in which the jaws are minimally spaced from the retainer axis and circumferentially from each other. The bolt is readily movable from the hold-out position to the clamping position in which the bolt engages the nut assembly and the jaws are maximally spaced from the retainer axis and circumferentially from each other.

Two problems have occasionally arisen with the retainer of said Basile U.S. Pat. No. 4,125,140.

First, with no bolt present, two of the three jaws of said Basile U.S. Pat. No. 4,125,140 may be accidentally held maximally spaced from the retainer axis and circumferentially from each other. With the parts in this condition, the third jaw can readily fall out of the retainer body, resulting in failure of the access panel fastener.

Second, the jaws of said Basile U.S. Pat. No. 4,125,140 can move to the fully opened position by radial pressure applied in either axial direction. Thus, the bolt can be pulled through the jaws over a shoulder of the bolt with a quick, wrenching motion of the bolt, thus undesirably disengaging the bolt from the retainer.

The first of these problems with the retainer of said Basile U.S. Pat. No. 4,125,140 is overcome by the present invention by replacing the three jaws, each of which is roughly 120° in circumferential extent, with two jaws each of which is of larger dimensions than each of the three jaws.

The second of these problems with the retainer of said Basile U.S. Pat. No. 4,125,140 is overcome by providing each jaw with a flanged portion or boss which engages the wall of the retainer aperture when the bolt is pulled in the axial direction which tends to remove the bolt from the retainer, the engagement of the jaw bosses with the retainer aperture limiting the opening of the jaws to an intermediate position in which the shoulder of the bolt is prevented from passing between the jaws.

Accordingly, an important general object of the present invention is to provide a retainer for an access panel fastener which is an improvement over that of said Basile U.S. Pat. No. 4,125,140.

It is an important specific object to provide an improved access panel fastener retainer having jaws which can not become dislodged from the retainer.

It is another important specific object to provide an improved access panel fastener retainer having jaws with means for limiting the opening of the jaws to an intermediate position in which the shoulder of the bolt can not pass between the jaws, thus preventing the bolt from being disassembled from the retainer.

It has been found, too, that with the retainer of said Basile U.S. Pat. No. 4,125,140, the jaws tend to cause wear of the bolt threads, such wear limiting the effective life of the access panel fastener, which must be reusable over many reuses. The increased axial thickness of the jaws of the present application, provided by the jaw bosses, minimizes such bolt thread wear and increases the life of the access panel fastener.

It is therefore another important object to provide a retainer for an access panel fastener resulting in increased bolt life, thus increasing the life of the access panel fastener.

SUMMARY OF THE INVENTION

The invention is an improved bolt retainer for use as a component of an access panel fastener. The retainer comprises a grommet having first and second axial ends and an aperture in open communication with both ends. The grommet has a radial shoulder surface facing away from the first end and defining a portion of the aperture. The grommet also has an internal cylindrical surface confronting the grommet axis and extending toward the first end from the inner periphery of the shoulder surface.

The retainer also has a plurality of discrete retaining jaws in the aperture adjacent the radial shoulder surface and spring means resiliently biasing each jaw toward the grommet axis. The jaws are adapted to capture a bolt inserted into the first end of the aperture.

In one of its aspects, the retainer includes only two jaws, each of which is C-shaped and substantially 180° in circumferential extent.

In another aspect, each retainer jaw includes a boss which is adapted to enter the internal cylindrical surface of the grommet when axial force is applied to the jaws in the direction toward the first axial end of the grommet, with the jaws in the radially innermost positions thereof, thereupon to prevent the jaws from opening, thus to prevent disassembly of the bolt from the retainer.

In still another aspect, the jaws present to the bolt a configuration of greater axial length than the pitch of the bolt thread.

DESCRIPTION OF THE DRAWING

FIG. 1 is an axial sectional view of a preferred example of retainer embodying the invention;

FIG. 2 is a view on line 2—2 of FIG. 1;

FIG. 3 is an enlarged plan view of a jaw as shown in FIG. 2;

FIG. 4 is a view on line 4—4 of FIG. 3;

FIG. 5 is a view similar to FIG. 1 but showing a bolt in a first captive position relative to the retainer; and FIG. 6 is a view similar to FIG. 5 but showing the bolt in a second captive position relative to the retainer.

DESCRIPTION OF THE INVENTION

The drawing shows a preferred example of access panel fastener retainer 10 embodying the invention. Retainer 10 is an assembly comprising a ring-like grommet 12, a ring-like disc 14, a pair of identical jaws 16 and a cochlear spring 18, all of which are metallic.

The drawing also shows, in FIGS. 5 and 6, a bolt 20, which is another component of the access panel fastener.

Except as otherwise set forth herein, details of the access panel fastener and its operation may be as disclosed in said Basile U.S. Pat. No. 4,125,140.

FIGS. 5 and 6 further show retainer 10 permanently installed in an aperture through a panel 22 having parallel outer and inner faces 24 and 26, respectively. Panel 22 is to be secured to a structure (not shown) by the access panel fastener.

Bolt 20 includes a head 28 having internal wrenching means (not shown) and a frusto-conical clamping surface 30, a shank having an unthreaded cylindrical portion 32 axially adjacent head 28 and an externally threaded portion 34 axially adjacent portion 32, such that portion 32 is between head 28 and portion 34. The thread has predetermined major and minor diameters and a predetermined pitch. Portion 32 is of predetermined diameter the same as or slightly less than, the major thread diameter. At the axial end of portion 34 remote from portion 32, bolt 20 is provided with an end portion, indicated generally at 36 in FIG. 5. End portion 36 has a first cylindrical part 38 having a diameter which is smaller than the major diameter of the bolt thread and preferably intermediate the major and minor diameters thereof. First cylindrical part 38 is axially spaced from portion 34. Axially between first cylindrical part 38 and portion 34 is a second cylindrical part 40 of predetermined diameter smaller than the diameter of first cylindrical part 38 and at one axial end joined to first cylindrical part 38 by a plane annular shoulder 42 perpendicular to the bolt axis and facing head 28. Axially between and joining shoulder 42 and portion 34 is a first frusto-conical part 44 of predetermined conical angle and axial extent. End portion 36 has a plane circular surface 46 perpendicular to the bolt axis and axially spaced a predetermined distance from first cylindrical part 38 and having a diameter which is less than the diameter of first cylindrical part 38 but greater than that of second cylindrical part 40. Surface 46 is further from head 28 than is first cylindrical part 38 and provides the end of bolt 20 which is remote from head 28. Finally, end portion 36 has a second frustoconical part 48 of predetermined conical angle and axial extent and joining first cylindrical part 38 and surface 46.

Head 28, surface 30, shank portions 32 and 34 and end portion 36, including first and second cylindrical parts 38 and 40, annular shoulder 42, first and second frusto-conical parts 44 and 48 and surface 46 are all coaxial.

Grommet 12 provides retainer 10 with an annular body providing a retainer axis and cooperates with disc 14 to provide an axial aperture through retainer 10, the aperture being indicated generally at 50.

Grommet 12 has a plane annular surface 52 perpendicular to the retainer axis and providing a first axial end of retainer 10 adapted to be flush with outer face 24 of panel 22 when retainer 10 is installed in panel 22, as shown in FIGS. 5 and 6.

Grommet 12 is internally shaped to provide aperture 50 with a frusto-conical surface 54, a first cylindrical surface 56, a first plane shoulder surface 58 and a second cylindrical surface 60. First cylindrical surface 56 intersects first plane shoulder surface 58 in a circle at the radially inner edge of surface 58 and second cylindrical surface 60 intersects first plane shoulder surface 58 in a circle at the radially outer edge of surface 58.

Surface 52, frusto-conical surface 54, first and second cylindrical surfaces 56 and 60 and first shoulder surface 58 are all concentric with the retainer axis.

Grommet 12 also has a second plane shoulder surface 62 and a third cylindrical surface 64, all concentric with the retainer axis.

Grommet 12 terminates at its axial end remote from surface 52 in an annular skirt, which for simplicity is unnumbered, but which is internally a continuation of surface 64.

Disc 14 has a parallel first and second faces 66 and 68, respectively, and internal and external coaxial cylindrical surfaces 70 and 72, respectively, joining faces 66 and 68. The juncture of face 68 and surface 72 is stepped, as indicated at 74.

External cylindrical disc surface 72 has a diameter which is just barely less than the diameter of grommet surface 64 but larger than the diameter of grommet surface 60.

Disc 14 is assembled with grommet 12 with disc surface 66 confronting and engaging grommet surface 62 and held in place by rolling or turning the retainer skirt inwardly to engage stepped juncture 74 between face 68 and surface 72, as shown at 76.

The portion of retainer aperture 50 which is not provided by grommet 12 is provided by face 66 and surface 70 of disc 14. Disc face 68 provides the second axial end of retainer 10. The axial ends of retainer 10 are parallel to each other and are axially spaced a distance equal to the thickness of panel 22. Thus, when retainer 10 is installed in the panel aperture in the manner disclosed in said Basile U.S. Pat. No. 4,125,140, grommet surface 52 is flush with panel face 24 and disc surface 68 is flush with panel face 26.

Each jaw 16 is in plan view more or less of C-shape and has upper and lower plane parallel faces 78 and 80, respectively, which are joined by a convex cylindrical surface 82 defining a jaw axis perpendicular to faces 78 and 80.

Opposite arcuate ends of surface 82 terminate in like parallel plane surfaces 84 and 86 which face away from each other and join surface 82 in jaw corners 88 and 90, respectively, jaw corners 88 and 90 being line segments perpendicular to faces 78 and 80.

Surfaces 84 and 86 terminate in plane coplanar surfaces 92 and 94, respectively, which are perpendicular to faces 78 and 80 and extend toward each other from surfaces 84 and 86.

Each jaw 16 also has a concave cylindrical surface 96, the axis of which is parallel to that of surface 82 and lies in a plane half way between surfaces 84 and 86. The radius of curvature of surface 96 is substantially less than that of surface 82.

Each jaw 16 further has a concave cylindrical surface 98 which is coaxial with surface 82 and joins surfaces 92 and 96 and a concave cylindrical surface 100 which is coaxial with surface 82 and joins surfaces 94 and 96. Surfaces 98 and 100 are of the same diameter and are mirror images of each other with respect to the plane parallel to and midway between surfaces 84 and 86.

Additionally, each jaw 16 has a boss 102 protruding from face 78. Boss 102 has a face 104 which is parallel to faces 78 and 80 and is spaced from surface 80 a distance greater than the distance between faces 78 and 80. Boss 102 has a convex cylindrical surface 106 joining faces 78 and 104. The axis of surface 106 is perpendicular to face 104 and lies in the plane parallel to and midway between surfaces 84 and 86, and also lies substantially in the plane of surfaces 92 and 94. Circumferentially, surface 106 is substantially 180° in extent.

Internally, boss 102 is substantially a continuation of surfaces 96, 98 and 100 and partially of surfaces 92 and 94 as well.

Cochlear spring 18 includes a plurality of coils which are tightly wrapped on one another in the same plane and having in the unstressed condition at least about 2½ to 3 turns and an internal diameter somewhat less than the diameter of jaw surface 82.

The axial extent of spring 18 is about the same as the distance between jaw faces 80 and 104.

Two jaws 16 are assembled with cochlear spring 18 by placing those jaws 16 with surface 92 of each engaging surface 94 of the other and faces 80 coplanar. Spring 18 is then expanded and placed around and in engagement with jaw surfaces 82. In this condition, spring 18 has at least about two turns and engages jaws 16 at jaw corners 88 and 90.

The assembly of jaws 16 and spring 18 is placed in aperture 50 of grommet 12 with bosses 102 axially facing grommet surface 52, i.e., the first axial end of retainer 10, this, of course, being done prior to the assembly of disc 14 and grommet 12 as aforesaid.

Some further dimensional relationships of the parts will now be given.

The conical angle of frusto-conical surface 54 of grommet 12 is substantially the same as that of bolt clamping surface 30, namely, about 100° and the axial extent of bolt head 28 is substantially the same as that of frusto-conical surface 54.

The diameter of cylindrical surface 56 is slightly greater than the major thread diameter of bolt 20.

The axial length of cylindrical surface 56 is slightly greater than axial extent of jaw bosses 102, i.e., the distance between faces 78 and 104.

The diameter of surface 60 is greater than the maximum operative outside diameter of spring 18, i.e., the outside diameter of spring 18 when unthreaded cylindrical portion 32 of the shank of bolt 20 has spread jaws 16 to the maximum radial extent, as shown in FIG. 6, in which condition spring 18 engages jaw surfaces 82 throughout substantially the entire circumferential extent thereof and not just at jaw corners 88 and 90.

The axial extent of surface 60, i.e. the distance between surface 58 and face 66, is slightly greater than the distance between jaw faces 80 and 104, which, as stated, is about the same as the axial extent of spring 18.

The diameter of disc surface 70 is about the same as that of cylindrical surface 56, i.e., slightly greater than that of unthreaded cylindrical portion 32 of the shank of bolt 20, and surfaces 56 and 70 are coaxial.

To be specific, the axial extent of surface 60 may be about 0.050 inch, the distance between jaw faces 80 and 104 may be about 0.031 inch and the distance between jaw faces 80 and 104 may be about 0.042 inch.

The diameter of jaw surface 82 is somewhat less than the diameter of grommet surface 60, so that spring 18 may be therebetween when the shank of bolt 20 has spread jaws to the maximum radial extent, without engagement of spring 18 with surface 60.

The diameter of first cylindrical part 38 of bolt 20 is greater than the diameter of jaw surfaces 96, is greater than that of second cylindrical part 40 and may be intermediate the major and minor diameters of the thread of bolt 20. The diameter of circular surface 46 of bolt 20 is less than the diameter of jaw surfaces 96.

The axial length of second cylindrical part 40 of bolt 20 is slightly greater than the distance between jaw faces 80 and 104 and is about the same as the axial extent of surface 60.

The diameter of jaw surfaces 96 is substantially the same as or slightly greater than the diameter of second cylindrical portion 40 of bolt 20, and the diameter of jaw surfaces 98 and 100 is substantially the same as or slightly greater than the diameter of unthreaded cylindrical portion 32 of the shank of bolt 20.

The diameter of cylindrial surfaces 106 of jaw bosses 102 is slightly less than that of grommet surface 56, so that with jaws 16 positioned in the radially innermost positions thereof, i.e., with surface 92 of each jaw 16 abutting surface 94 of the other jaw 16, as shown in FIG. 2, surfaces 106 define a circle which will just fit within grommet surface 56.

Furthermore, the distance between jaw faces 80 and 104 is substantially greater than the pitch of the thread of bolt 20. Examples of jaws made in accordance with said Basile U.S. Pat. No. 4,125,140 have a thickness which is less than the thread pitch, in one example the thickness being about 0.031 inch compared with a thread pitch of 0.036 inch. The design of jaws 16 is such that the distance between faces 80 and 104 is about 0.042 inch, which is substantially greater than said thread pitch.

In use, retainer 10 is installed in panel 22 as aforesaid and bolt 20 is installed in retainer 10, by inserting end portion 36 of bolt 20 into retainer aperture 50, from the axial end of aperture 50 having frusto-conical surface 54, and pushing end portion 36 between jaws 16. This causes frusto-conical part 48 to cam jaws 16 radially outwardly against the resistance of spring 18 until first cylindrical part 38 of bolt 20 has completely traversed jaws 16 in the axial direction. Spring 18 then causes jaws 16 to snap inwardly past annular bolt shoulder 42, to the position shown in FIG. 5, and bolt 20 is permanently captured by retainer 10.

FIG. 5 depicts the parts in the hold-out position, in which bolt 20 protrudes from outer face 24 of panel 22 and is held in such position by the engagement of jaw surfaces 96 with second cylindrical part 40 of bolt 20.

Bolt 20 is nevertheless readily movable from the hold-out position of FIG. 5 to a clamping or securing position shown in FIG. 6 by pushing bolt 20 further through aperture 50 until bolt clamping surface 30 engages frusto-conical surface 54 of grommet 12, as shown in FIG. 6 while turning bolt 20, causing threaded portion 20 to engage a nut assembly (not shown) which is mounted on a structure (not shown) to which panel 22 is to be secured by the access panel fastener, or a plurality of same.

Movement of bolt 20 from the hold-out position of FIG. 5 to the clamping or securing position of FIG. 6 is accompanied by outward camming of jaws 16 against the resistance of spring 18, as frusto-conical part 44 of bolt 20 traverses jaws 16 and threaded portion 34 and then unthreaded portion 32 of the shank of bolt 20 traverse jaws 16, until bolt clamping surface 30 engages frusto-conical grommet surface 54, as shown in FIG. 6. In the clamping position, jaws 16 are spread to the maximum condition, in which there is still a radial clearance between spring 18 and grommet surface 60. Also in the clamping position, unthreaded bolt shank portion 32 is substantially engaged by jaw surfaces 98 and 100.

To revert to the hold-out position of bolt 20, if a force having a non-axial component is applied to bolt 20 tending to remove bolt 20 from retainer 10, that is, tending to move bolt shoulder 42 axially past jaws 16, bolt shoulder 42 will move jaws 16 so that bosses 102 enter surface 54, thus to limit divergence of jaws 16 from each other sufficiently so that bolt surface 42 can not get past jaws 16, thus desirably preventing disassembly of bolt 20 from retainer 10.

As stated above, with the jaws of said Basile U.S. Pat. No. 4,125,140, it is undesirably possible to disassemble the bolt from the retainer by giving the bolt a quick, wrenching motion while in the hold-out position. This is rendered impossible by the present invention because of the engagement of boss surfaces 106 with surface 56.

It is also noteworthy that, where no bolt 20 is present, as shown in FIGS. 1 and 2, if jaws 16 should be caused to separate, it is impossible for either jaw 16 to be removed from retainer 10. This is because each of the two jaws 16 is roughly 180° in circumferential extent. This is another significant improvement realized by retainer 10 over the retainer of said Basile U.S. Pat. No. 4,125,140, which retainer has three jaws, each of which is roughly only 120° in circumferential extent.

Furthermore, in examples of jaws made in accordance with of said Basile U.S. Pat. No. 4,125,140, the axial thickness of each of the three jaws is less than the pitch of the bolt thread, shortening the life of the access panel fastener due to bolt thread wear. In contrast, in retainer 10, the axial thickness of each jaw 16, as presented to bolt 20, is substantially greater than the pitch of the thread of bolt 20, resulting in less thread wear and increased access panel fastener life.

It will be appreciated that the invention is well adapted to the attainment of the aforesaid objects and advantages, among others.

The disclosed details are not to be taken as limitations on the invention, except as those details may be included in the appended claims.

The embodiments of the invention in which an exclusive property or privilege is claimed are as follows:

1. A retainer for use as a component of an access panel fastener for securing a panel to a structure, said retainer comprising a grommet having first and second axial ends and an axial aperture in open communication with each said end and adapted to capture a bolt inserted into said first end, said grommet having a radial shoulder surface facing away from said first end and defining a portion of said aperture and an internal surface extending toward said first end from and intersecting said shoulder surface at the radially inward edge thereof and defining a further portion of said aperture, only two discrete retaining jaws in said aperture, each said jaw having a first face confronting and overlapping said radial shoulder surface and a second face facing away from said first face and a boss extending toward said first grommet end from said first face, said boss adapted to pass the radially inward edge of said radial shoulder surface to enter said internal surface of said grommet when force is applied to said jaws tending to move the same toward said first grommet end when said jaws are in the radially innermost positions thereof; and spring means resiliently biasing each said jaw radially inwardly toward the grommet axis, each said jaw being C-shaped and substantially 180° in circumferential extent.

2. The invention of claim 1 wherein each said boss has an external cylindrical surface of smaller diameter than that of said internal surface of said grommet, said external cylindrical surfaces of said jaws adapted to fit within said internal surface of said grommet.

3. The invention of claim 1 wherein said bolt is of predetermined thread size and predetermined thread pitch and each said jaw has a concave bolt confronting and engaging configuration having an axial length which is greater than said pitch.

4. The invention of claim 2 wheren said bolt is of predetermined thread size and predetermined pitch, said first and second jaw faces are parallel to each other, said boss has a face which is parallel to said first and second jaw faces, said boss having a concave configuration confronting said bolt and extending substantially continuously from said second jaw face to said boss face at each circumferential location and the distance from said second jaw face to said boss face being greater than said pitch.

5. The invention of claim 4 wherein said first and second jaw faces are spaced apart a distance less than said pitch.

6. A retainer for use as a component of an access panel fastener for securing a panel to a structure, said retainer comprising a grommet having first and second axial ends and an axial aperture in open communication with each said end and adapted to capture a bolt inserted into said first end, said grommet having a radial shoulder surface facing away from said first end and defining a portion of said aperture and an internal surface extending toward said first end from and intersecting said shoulder surface at the radially inward edge thereof and defining a further portion of said aperture, a plurality of discrete retaining jaws in said aperture, and spring means resiliently biasing each said jaw radially inwardly toward the grommet axis, each said jaw having a first face confronting and overlapping said radial shoulder surface, a second face facing away from said first face and a boss extending toward said first grommet end from said first face, said boss adapted to enter said internal surface of said grommet when force is applied to said jaws tending to move the same toward said first grommet end when said jaws are in the radially innermost positions thereof.

7. The invention of claim 6 wherein each said boss has an external cylindrical surface of smaller diameter than that of said internal surface of said grommet.

8. The invention of claim 7 wherein said bolt is of predetermined thread size and predetermined thread pitch and each said jaw has a concave bolt confronting and engaging configuration having an axial length which is greater than said pitch.

9. The invention of claim 7 wherein said bolt is of predetermined thread size and predetermined pitch, said first and second jaw faces are parallel to each other, said boss has a face which is parallel to said first and second jaw faces, each said jaw having a concave bolt confronting and engaging configuration extending substantially continuously from said second jaw face to said boss face at each circumferential location and the distance from said second jaw face to said boss face being greater than said pitch.

10. The invention of claim 9 wherein said first and second jaw faces are spaced apart a distance less than said pitch.

* * * * *